Nov. 10, 1931.    A. L. RITTER    1,831,686
CULTIVATOR AND WEEDER
Filed June 27, 1928    2 Sheets-Sheet 1
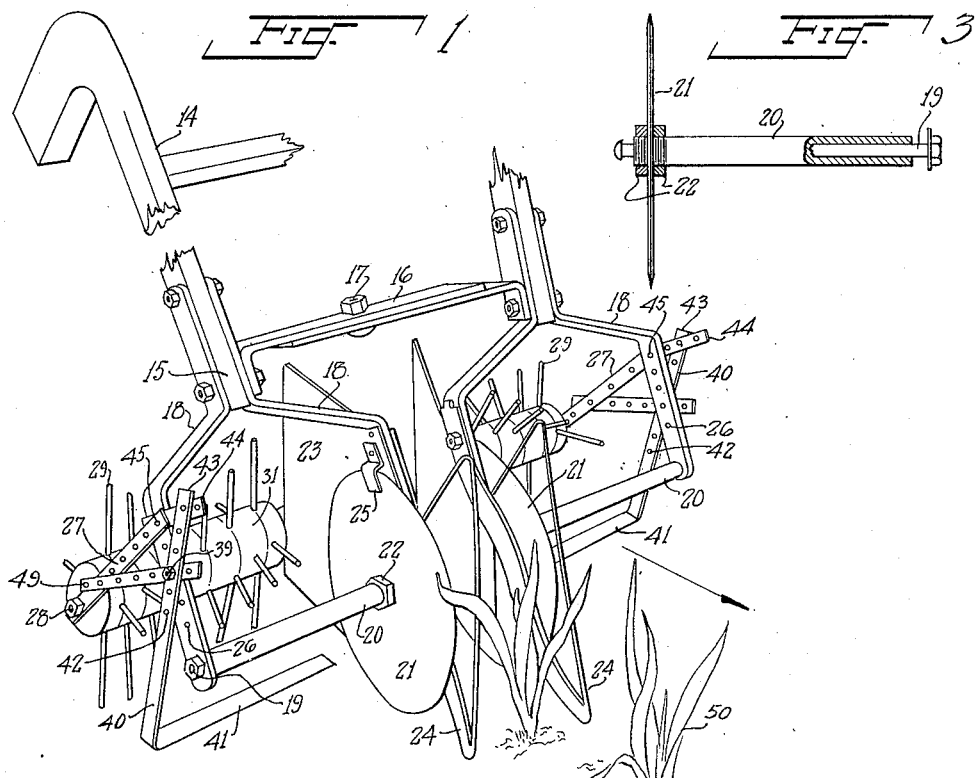
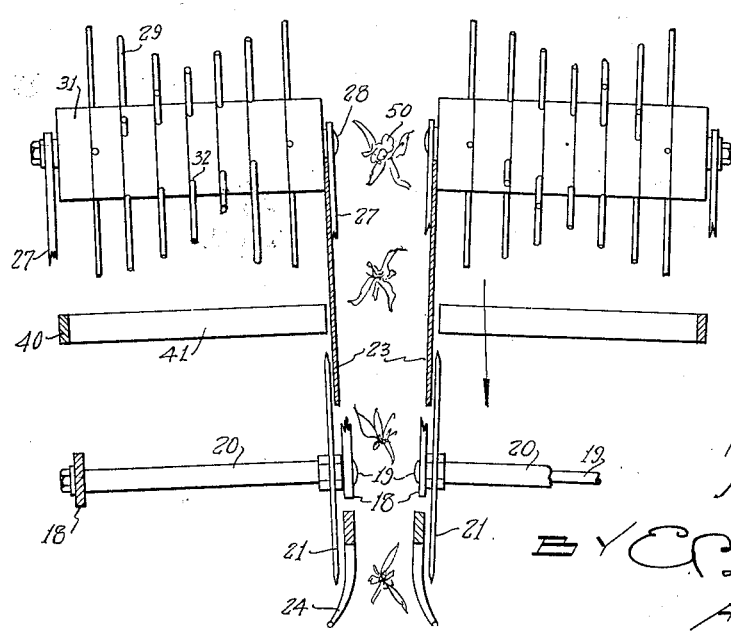
INVENTOR
A. L. Ritter
BY C. B. Birkenbeuel
ATTORNEY

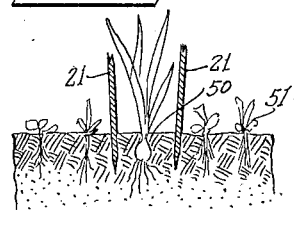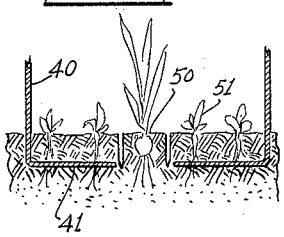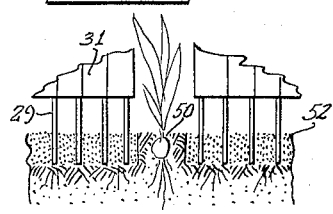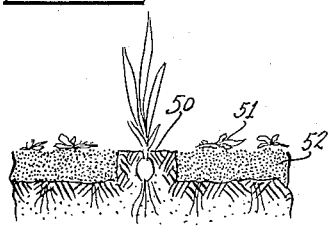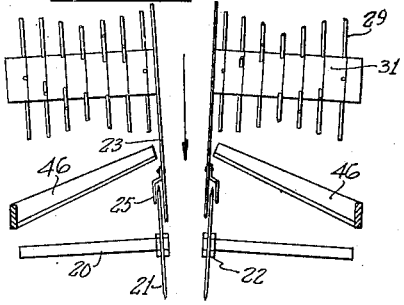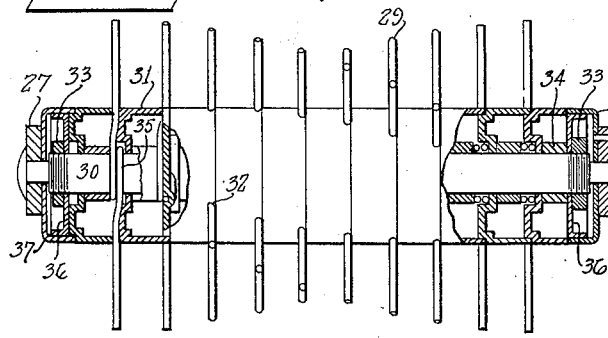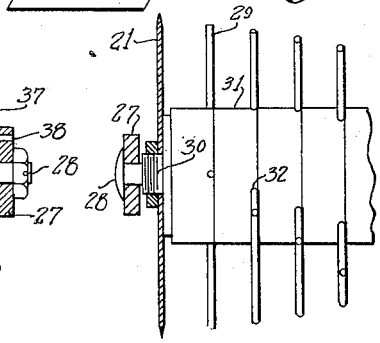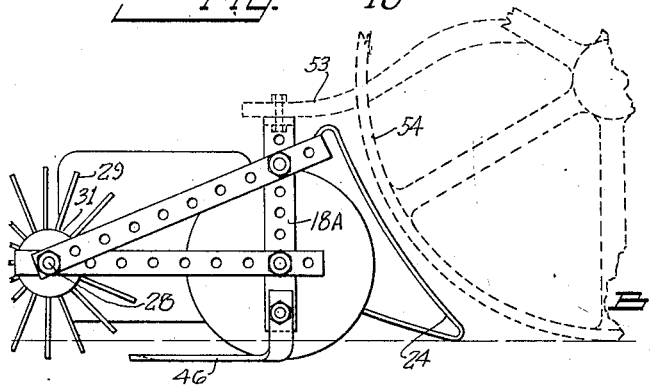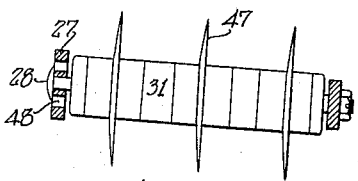

Patented Nov. 10, 1931

1,831,686

UNITED STATES PATENT OFFICE

ADOLPH L. RITTER, OF SIFTON, WASHINGTON

CULTIVATOR AND WEEDER

Application filed June 27, 1928. Serial No. 288,655.

This invention relates generally to agricultural implements, and particularly to that type of cultivator especially adapted for the cultivation and weeding of small plants.

The main object of this invention is to provide a light, efficient, inexpensive and easily operated cultivator, the use of which will eliminate a large portion of the hand labor ordinarily required for hand weeding.

The second object is to construct a cultivator which will move steadily along the ground without vertical or lateral jumping movements in order that it may be useful with small plant crops, and by making it possible to work much closer to the plant than would ordinarily be practical.

The third object is to avoid any tendency of covering up the plants during the cultivation or the injury of any particular plants which may be leafing or may have fallen over.

The fourth object is to deposit the weeds on the top of the newly mulched earth after the cultivator has passed over, in order that they may be destroyed.

The fifth object is to make it possible for a gardener to cultivate his crops at more nearly the correct time by reducing the actual amount of time required for the operation.

The sixth object is to arrange the operations performed by the cultivator that each element thereof will perform its own particular operation in the best possible manner, namely that the weeds will be cut off under the ground before the ground has become loosened, or, in other words, that the weed is firmly held by the ground until the severing operation is performed.

The seventh object is to so construct the cultivator that it will throw the weeds away from the knives to reduce the possibility of choking same.

The eighth object is to so construct the cultivator that it may be used to straddle the row and to be adapted to hand or tractor use to suit the convenience.

The ninth object is to so construct the cultivator as to provide a wide range of adjustment and arrangement of parts thereon to meet the varying conditions under which the agriculturist must labor.

These, and other objects, will become more apparent from the specification following as illustrated in the accompanying drawings, in which:

Figure 1 is a perspective view of the complete device straddling a row of plants just prior to beginning work. Figure 2 is a horizontal section through the cultivator taken just above the axes of the cylinder and disk showing the relation of the various parts to the plants. Figure 3 is a detail of the cutting disk and its shaft. Figure 4 is a detail view of the pulverizing cylinder showing its internal construction. Figure 5 is a section through the lower portion of the cutting disk showing the manner in which they line out a row of plants. Figure 6 is a section through the cutting knives in which they sever the weed roots before the ground around them has been disturbed. Figure 7 shows the action of the pulverizing cylinders. Figure 8 shows the completed job with the plants undisturbed in a narrow central ridge and the weeds left on top of the mulched ground to die. Figure 9 is a fragmentary end view of a pulverizing cylinder showing the cutting disk mounted thereon as an alternative form. Figure 10 is a side elevation showing the device adapted for use with a tractor. Figure 11 is a somewhat diagrammatic horizontal section showing the cutting knives converging. Figure 12 illustrates a modified form of pulverizing cylinder usually employing disks instead of spikes.

Similar numbers of reference refer to similar parts throughout the several views.

Referring in detail to the drawings, in its preferred form the device consists of a handled end frame 14 whose lower ends 15 are joined by an adjustable brace member 16 which is secured by a bolt 17. Each end 15 is provided with a pair of forked members 18 having mounted across the lower ends thereof a bolt 19 on which is rotatably mounted a tubular hub 20 on which is placed the cutting disk 21 which is secured to the hub by the nuts 22 on each side thereof.

Each innermost forked member 18 has mounted thereon a weed guard 23 which extends backwardly, or toward the operator, and also a pick-up arm 24 which extends forwardly and is adapted to gather up the leaves of the plants before they are cut off or covered, and to direct them to the safety zone between the guards 23. Each innermost member 18 is also provided with a cleaner blade 25 which extends over the cutting disk 21, keeping it free from soil, weeds, trash, etc. Each outermost forked member 18 is provided with a series of perforations 26 to which may be adjustably attached other elements. To one opening 26 in each of the four members 18 is attached an end of a perforated arm 27 across whose lower ends are mounted the bolts 28 which form the axis for the pulverizing cylinders, each of which consists of a plurality of wire spikes 29 wound on the tubular member 30 and spaced by the shouldered sections 31 provided with notches 32 to permit the wires to pass between the sections and to be firmly held thereby. Each end of the tube 30 is threaded and provided with a nut 33 for holding the sections in place. Spacer sleeves 34 are also provided between the sections 31 for the purpose of holding the coiled portion 35 of the spikes 29.

The nuts 33 bear directly against a dished end 36 over which extends an oppositely dished weed guard cap 37 which is secured to the arm 27 by means of a rivet 38.

On each outer member 18 is mounted a bolt 39 which carries the side arm 40 of an L-shaped knife 41, which knife is in front of the spikes 29 of the pulverizer cylinder. The arm 40 is provided with perforations 42 and its upper end 43 held by means of a clamping bar 44 to the bolt 45, which also fastens the arm 27.

In the form of the device shown in Figure 9 the disk 21 is placed directly on the pulverizer roll shaft 30 to satisfy certain requirements made by the agriculturist, although normally it is desirable to hold the disk 21 in advance of both the weed cutting knife 41 and the pulverizing spikes 29.

In the form of the device shown in Figure 10 instead of being mounted on a handled frame 14 (as shown in Fig. 1) the forks 18—A are attached directly to the draw bar 53 of the wheeled vehicle 54, usually self-propelled.

In Figure 11 the weed cutting knives 46 are shown angling perceptibly with relation to the line of travel, which is also desirable under certain conditions.

In Figure 12 dished disks 47 are employed between the sections 31 of the pulverizing cylinder and three disks are normally all that are required, although of course in certain soils and under certain conditions more could be used with equal or greater advantage. When more disks are employed it is desirable to provide additional holes 48 in the arm 27 to permit variations in angularity of the pulverizing cylinder axes, although it is obvious that considerable variation can be obtained due to a flexibility in the parts themselves and the selection of holes in the members 26 and 27 and in the braces 49 which secure the lower ends of the arms 27.

The operation of this device is as follows: Assuming the parts to be assembled as shown in Fig. 1 and adjusted to the height of the operator, the width of the plant ridge, the depth of the weed cutting knife and the position of the pulverizing spikes, the operator merely pushes the cultivator ahead of him, which performs the following successive operations:—first, lining out the plant row 50, as shown in Fig. 5, by means of the disks 21; second, cutting the roots of the weeds 51, as shown in Fig. 6, by means of the knives 41; third, the thorough pulverization of the soil 52 between the ridges or plant rows 50 by means of the spikes 29 and the simultaneous depositing of the weeds 51 on top of the pulverized soil 52.

Referring again to the form of the device shown in Figure 9 wherein the cutting disk 21 is coaxial with the shaft 30 and mounted thereon, when so used it will be understood that the pulverizing spikes 29 or disks 47, as the case may be, will be mounted in front of the knife blade 41 instead of behind same, which would be the desirable manner of operating same when the ground is relatively hard and the number and size of weeds small, in which case the cultivator could be operated with much less manual effort than if operated as shown in Figure 1; although at other times it would naturally be desirable to have the cutting blade 21 ahead of the cultivator.

Attention is drawn to my Patent 1,682,538 on a cultivator and weeder, over which this device is an improvement.

I am aware that many forms of cultivators and weeders have been constructed in the past; I therefore do not intend to cover such devices broadly, but I do intend to cover all such forms and modifications thereof as fall fairly within the appended claims.

I claim:

1. A cultivator having in combination a frame, a pair of laterally spaced spiked cylinders mounted at the rear of said frame, a pair of upright cutting disks mounted on said frame in front of said cylinders adapted to cut the ground centrally of the strips cultivated by said cylinders, horizontal cutting knives supported by said frame between said cutting disks and said spiked cylinders, and means for adjusting the relationship between said cylinders, knives and disks.

2. In a cultivator the combination of a pair of upright cutting disks adapted to straddle the plant row, a pair of horizontal cutting knives outside of and behind said cutting disks, a spiked pulverizing cylinder directly behind each cutting knife, a guard extending from each cutting disk backwardly past the inner end of each pulverizing cylinder, and means for holding the various members in relation to each other.

ADOLPH L. RITTER.